United States Patent [19]

Donado et al.

[11] Patent Number: 5,206,095
[45] Date of Patent: Apr. 27, 1993

[54] CARBONATE FUEL CELL ANODES

[75] Inventors: Rafael A. Donado, Chicago; Kenneth E. Hrdina, Glenview; Robert J. Remick, Bolingbrook, all of Ill.

[73] Assignee: Institute of Gas Technology, Chicago, Ill.

[21] Appl. No.: 495,277

[22] Filed: Mar. 19, 1990

[51] Int. Cl.$^5$ .............................. H01M 4/86
[52] U.S. Cl. ........................ 429/16; 429/40; 502/101
[58] Field of Search .............. 429/16, 40; 502/101

[56] References Cited

U.S. PATENT DOCUMENTS

| | | |
|---|---|---|
| 3,291,753 | 12/1966 | Thompson . |
| 3,431,146 | 3/1969 | Truitt ................................. 429/16 |
| 4,079,171 | 3/1978 | Marianowski et al. . |
| 4,127,468 | 11/1978 | Alfenaar . |
| 4,158,720 | 6/1979 | Kaun . |
| 4,164,069 | 8/1979 | Tomczuk . |
| 4,175,153 | 11/1979 | Dobo . |
| 4,247,604 | 1/1981 | Marianowski . |
| 4,317,866 | 3/1982 | Trocciola . |
| 4,324,846 | 4/1982 | Kaun . |
| 4,340,652 | 7/1982 | Raistrick . |
| 4,404,267 | 9/1983 | Iacovangelo . |
| 4,564,567 | 1/1986 | Kucera . |
| 4,714,586 | 12/1987 | Swarr . |
| 4,728,590 | 3/1988 | Redey . |
| 4,731,307 | 3/1988 | Guidotti . |
| 4,761,487 | 8/1988 | Godshall . |
| 4,780,437 | 10/1988 | Smith . |
| 4,797,379 | 1/1989 | Patel et al. ...................... 429/16 X |
| 4,851,306 | 7/1989 | Kaun . |
| 4,939,111 | 7/1990 | Kaun et al. ...................... 429/45 X |

*Primary Examiner*—Stephen Kalafut
*Attorney, Agent, or Firm*—Speckman & Pauley

[57] ABSTRACT

A molten alkali metal carbonates fuel cell porous anode of lithium ferrite and a metal or metal alloy of nickel, cobalt, nickel/iron, cobalt/iron, nickel/iron/aluminum, cobalt/iron/aluminum and mixtures thereof wherein the total iron content including ferrite and iron of the composite is about 25 to about 80 percent, based upon the total anode, provided aluminum when present is less than about 5 weight percent of the anode. A process for production of the lithium ferrite containing anode by slipcasting.

21 Claims, No Drawings

CARBONATE FUEL CELL ANODES

This invention was made as a result of work under Contract No. DE-AC21-88MC25026 granted by the United States Department of Energy.

BACKGROUND OF THE INVENTION

1. Field of the Invention

This invention relates to molten alkali metal carbonates fuel cells and particularly to porous anodes in contact with alkali metal carbonates electrolytes over long periods of high temperature operation The invention more specifically relates to molten alkali metal carbonates fuel cell porous anodes of nickel, cobalt, and mixtures thereof additionally comprising lithium ferrite and iron. It is important that the total iron content of the anode including the ferrite and the metallic iron of the composite be in excess of about 25 weight percent. The anodes of this invention provide good mechanical properties, good electrical properties and good electrocatalytic properties under molten alkali carbonates fuel cell operating conditions.

2. Description of the Prior Art

Molten carbonates fuel cells generally comprise two electrodes with their current collectors, a cathode and an anode, an electrolyte tile making contact with both the electrodes and a cell housing to physically retain the cell components. Under fuel cell operating conditions, in the range of about 500° to about 700° C., the entire electrolyte tile, the carbonate and the inert support material, forms a paste and thus the electrolyte diaphragms of this type are known as paste electrolytes. The electrolyte is in direct contact with the electrodes where the three phase reactions (gas-electrolyte-electrode) take place. Hydrogen is consumed in the anode area producing water, carbon dioxide and electrons. The electrons flow to the cathode through an external circuit producing the desired current flow. At the anode there must be ready entry for the reactant gas, ready exit for the chemical reaction products and ready exit for the product electrons To maintain a high level of stable, long term performance, both electrolyte and electrode design and properties must be optimized and stabilized at the gas-electrolyte-electrode interface.

Porous anodes of cobalt or nickel alloyed with chromium or containing aluminum oxide have been previously used in molten carbonates fuel cells. Improved molten alkali metal carbonates fuel cell porous anodes principally of cobalt or nickel and having a stabilizing agent of chromium, zirconium oxide, or aluminum oxide to maintain porosity and surface area of the anode during fuel cell operation are taught by U.S. Pat. No. 4,247,604. Molten carbonates fuel cell anodes of nickel-chromium are also taught by U.S. Pat. Nos. 4,404,267 and 4,714,586. U.S. Pat. No. 4,317,866 teaches high purity ceria as a molten carbonates fuel cell anode material.

Nickel and iron have been used in specific manners as electrode materials in certain types of fuel cells. U.S. Pat. No. 4,175,153 teaches a hollow fiber structure of nickel and iron having non-porous compact surface layers which are taught to be useful in fuel cell electrodes, particularly in alkali carbonate liquid electrolyte fuel cells. U.S. Pat. No. 3,291,753 teaches fuel cell electrodes which may have a catalytic metal alloy of nickel and iron on a carbon support material. U.S. Pat. No. 4,127,468 teaches a process for preparing porous metal alloy electrodes wherein the metal alloy may broadly include nickel and iron, the electrodes being useful in fuel cells.

U.S. Pat. No. 4,780,437 teaches molten carbonates fuel cell electrodes with elongated pores across the electrode which is fabricated by tape casting forming porous cathodes of porous lithiated nickel oxides or other transition metal oxides possibly combined as oxygenates with lithium, such as $LiFeO_2$. U.S. Pat. No. 4,564,567 teaches a ceramic fuel cell cathode of doped alkali-metal, transition-metal oxide which may include $LiFeO_2$, for molten carbonates fuel cells.

A number of patents relate to various electrode materials useful in lithium batteries: U.S. Pat. No. 4,851,306 teaching electrodes formed of lithium alloy/FeS or lithium alloy/$FeS_2$ and two lithium alloy phases, one of aluminum and the other of aluminum and iron of which up to 50 mol % of the iron may be substituted with nickel or cobalt; U.S. Pat. No. 4,761,487 teaching a Li/Fe/S cathode for batteries; U.S. Pat. No. 4,731,307 teaching lithiated $FeS_2$ cathode materials for batteries; U.S. Pat. No. 4,340,652 teaching a ternary Li-Fe-O positive electrodes for lithium electrochemical cells; U.S. Pat. No. 4,164,069 teaching $Li_2FeS_2$ as a positive electrode metal in an electrochemical cell. U.S. Pat. Nos. 4,158,720 and 4,324,846 teach secondary electrochemical cells having a negative electrode of lithium-/aluminum/ferrite. U.S. Pat. No. 4,728,590 teaches secondary electrochemical cells having a positive electrode of iron sulfide, nickel sulfide and lithium sulfide.

SUMMARY OF THE INVENTION

It is an object of this invention to provide a molten alkali metal carbonates fuel cell having a stable anode providing high power densities necessary for practical fuel cell operation over long periods of time.

It is another object of this invention to provide improved molten alkali metal carbonates fuel cell porous anodes exhibiting good mechanical properties, electrical properties, and electrocatalytic properties over long periods of operation under molten carbonates fuel cell operating conditions.

It is yet another object of this invention to provide improved molten alkali metal carbonates fuel cell porous anodes of nickel, cobalt and mixtures thereof, iron and lithium ferrite.

It is still another object of this invention to provide a process for production of molten alkali metal carbonates fuel cell porous metal anodes of nickel, cobalt and mixtures thereof, iron and lithium ferrite.

The molten alkali metal carbonates fuel cell porous anode of this invention comprises a composite of lithium ferrite and a metal or metal alloy selected from the group consisting of nickel, cobalt, nickel/iron, cobalt/iron, nickel/iron/aluminum, and cobalt/iron/aluminum, and mixtures thereof wherein the total iron content of the composite, including the ferrite and the iron alloy, is about 25 to about 80 weight percent, based upon the total weight of the anode structure. The total amount of iron present in the anode of this invention is important, less than about 25 weight percent while providing satisfactory initial performance deteriorates more rapidly than desired due to poor mechanical strength. Greater than about 80 weight percent iron results in too high of an electrical resistance and the desired high electrical performance of the cell is not achieved. The molten alkali metal carbonates fuel cell porous anodes of this invention provide about the same performance characteristics as the 90% nickel-10% chromium anodes taught by U.S. Pat. No. 4,247,604 requiring the expensive and strategic metal chromium in the anodes as a stabilizing agent.

The porous anodes of this invention may be prepared by relatively simpler methods of slip casting followed by sintering as compared with the pressing of metal powders forming a green compact as taught by U.S. Pat. No. 4,247,604.

DESCRIPTION OF PREFERRED EMBODIMENTS

Molten alkali metal carbonates fuel cell porous anodes according to this invention comprise composites of lithium ferrite with a metal or metal alloy selected from the group consisting of nickel metal, cobalt metal, nickel/iron alloy, cobalt/iron alloy, nickel/cobalt/iron alloy, nickel/iron/aluminum alloy and cobalt/iron/aluminum alloy wherein the total iron content including the ferrite phase is about 25 to 80 weight percent based upon the total weight of the anode structure, provided that aluminum, when present, is less than about 5 weight percent and preferably about 1 to about 3 weight percent of the total anode structure. The iron may be present as metal, oxide, or alkali metal salt and mixtures thereof and the nickel and cobalt metals and iron containing alloys may be present initially as metals or as oxide mixtures which are reduced to metals in the anode environment. When iron containing metal alloys are used as starting materials it is preferred that the total iron content of the anode be about 30 to 50 weight percent and particularly preferred that the total iron content be about 35 to about 45 weight percent, based upon the total weight of all components forming the anode structure. When lithium ferrite and metal oxides are used as the starting material, it is preferred that the total lithium ferrite content be about 60 to about 90 weight percent of the total anode structure the remainder nickel or cobalt or a mixture thereof and particularly preferred that the total lithium ferrite content be 70 weight percent based upon the total weight of all components forming the anode structure. The final anode structure of this invention suitably has a porosity of about 40% to about 60% and greater than about 90% of the pores have diameters less than about 15 microns.

The porous anodes of this invention are particularly suited for use in molten carbonates fuel cells of the type described in U.S. Pat. No. 4,079,171. Such fuel cells have a binary or ternary electrolyte system of lithium and sodium or potassium carbonates. In these fuel cells under operating conditions, the alkali metal salts are predominantly lithium ferrite, $LiFeO_2$.

The porous anodes according to this invention may be prepared by mixing metal powder selected from the group consisting of nickel, nickel oxide, cobalt, cobalt oxide, nickel/aluminum alloy, cobalt/aluminum alloy and mixtures thereof with an iron powder selected from the group consisting of iron, iron oxide, lithium ferrite, and mixtures thereof, in quantities to form a powder mixture comprising about 25 to about 80 weight percent iron based upon the total weight of all components forming the anode structure. The powders used in forming the mixture preferably have a particle size of about 1 to about 40 microns diameter. Any suitable binder system, such as those using organic based acrylic binders or water based cellulose binders, may be used to provide strength to the powder mixture so that it may be handled, processed and maintained in the desired shape. In addition to the binder, the binder systems commonly used in tape casting may include defoaming agents, deflocculants and plasticizers. Sufficient liquid solvent is added to form a slurry of the powder mixture and binder system having a viscosity of 200 to 10,000 cP with the preferred viscosity of 800 to 4,500 cP. Suitable solvents include acetone and methylene chloride when an organic based binder system is used and water when a water based binder system is used. The slurry is then slipcast into a thin tape using a doctor blade. The tape is dried by evaporating the solvent at room temperature, if acetone or methylene chloride is used, or at about 60° C. if water is used as the solvent. Drying times may range from about 1 hour to 8 hours. The binder is removed by heating to about 400° C. to about 800° C. for 10 minutes to 4 hours. The powder mixtures which remain are sintered under a chemically reducing atmosphere, such as a nitrogen and hydrogen atmosphere, at about 800° C. to about 1100° C. for about 15 minutes to about 1 hour. The tape is then cooled to room temperature. Lithium hydroxide, LiOH, or lithium carbonate, $Li_2CO_3$, may be added to the tape at this time by coating the tape with powdered material and heating above the melting point of the lithium compound so that the lithium compound melts and penetrates into the porous structure in an amount sufficient to convert about 25 to about 85 percent of the iron present in the iron containing alloy to $LiFeO_2$. This pre-assembly loading of lithium compound into the anode structure is used to increase the total lithium inventory of the fuel cell and is not a process requirement for making the composite anode structures which are the subject of this invention.

Reaction of iron in iron-containing alloys with lithium hydroxide or lithium carbonate to form the lithium ferrite phase of the composite anodes of this invention may be performed externally in a pre-assembly oxidation process or in the assembled cell during the initial heat up of the carbonate fuel cell. The lithium required for this reaction may come from the lithium compound loaded in the structure prior to assembly, or from the molten electrolyte itself. The in-situ reaction is performed by purging the anode with a 0.5% hydrogen/99.5% nitrogen gas mixture with a 60° C. dew point instead of fuel gases during the initial heat up from room temperature to about 650° C. and maintaining this gas for about 1 to about 48 hours. Later when fuel gases containing hydrogen and carbon monoxide are passed through the anode compartment, any nickel or cobalt present in the anode structure which also oxidized during heat up will be reduced back to its metallic form leaving the $LiFeO_2$ in its oxidized form.

An alternative method for obtaining the desired $LiFeO_2$ phase is to begin the fabrication process using $LiFeO_2$ powder and a metal or metal oxide powder. Additional lithium is not required when this method is used and all nickel and cobalt oxides used in fabrication will be reduced to metallic components when fuel gases are added to the anode.

The anodes of this invention provide good electrocatalytic action since nickel, cobalt, iron, and lithium ferrite are all good electrocatalysts. The anodes fabricated from nickel/iron or cobalt/iron alloys provide strong, stable anodes with good electrical properties. While the exact action of the nickel/iron alloys in forming the lithium ferrite phase is not entirely understood, it is believed the formation of iron oxides internally on grain boundaries leads to excellent strength characteristics while the formation of lithium ferrite externally on the particle surfaces leads to excellent wetting properties.

The following examples are set forth in detail showing use of specific materials and specific process conditions and are meant to illustrate the invention and should not be considered limiting the invention in any way.

EXAMPLE I

Porous anodes were prepared from nickel and iron powders for 3 cm$^2$ laboratory scale molten alkali metal carbonates fuel cells in accordance with the process of this invention with 40 weight percent total iron. 126 grams nickel powder having an average diameter of 3 microns was mixed with 84 grams iron powder having an average diameter of less than 5 microns. 115 grams of 18 weight percent acrylic based binder system and 29 grams of methylene chloride were added with mixing to form a slurry. The slurry was slipcast to form a thin tape using a doctor blade opening of 1.1 mm and a slip viscosity of 3800 cP. The liquid solvent was allowed to evaporate from the tape by air drying at room temperature overnight. The dried tape was then heated from room temperature to 400° C. over a 4 hour period under a 10% $H_2$/90% $N_2$ atmosphere to remove the binder. The tape was then sintered by raising the temperature within the furnace from 400° C. to 850° C. in 3 hours and 15 minutes, holding at 850° C. for 45 minutes and then allowing the furnace to cool at its natural rate to room temperature. The tape was removed, coated with LiOH in an amount sufficient to react with 75% of the iron present in the tape, and returned to the furnace. The tape was heated to 740° C. under a 10% $H_2$/90% $N_2$ atmosphere and maintained at this temperature for 3 hours to allow the LiOH to melt and impregnate the porous metal.

Mercury porosimetry of the sintered porous plaque found the plaque to be 53% porous with 80% of the pores to be 2.2 to 8.2 microns diameter with a mean pore size of 4.68 microns.

The formed anodes were 0.73 mm thick.

EXAMPLE II

An anode as prepared in Example I was assembled into a molten alkali metal carbonates fuel cell using an electrolyte of 60 percent alkali metal carbonates and 40 percent lithium aluminate support and a porous nickel cathode 79% porous with a mean pore size of 8.2 microns.

The fuel cell was operated using fuel having dry composition of 75% $H_2$ and 25% $CO_2$ with moisture added. The cell was heated to an operating temperature of 650° C. over a 24 hour period and operation continued for 2000 hours with the following cell characteristics:

| Current | Cell Potential | Polarization | | Total Resistance |
|---|---|---|---|---|
| | | Anode | Cathode | |
| OCV | 1053 mV | | | |
| 80 mA/cm$^2$ | 981 mV | | | |
| 160 mA/cm$^2$ | 911 mV | 33 mV | 49 mV | 0.122 ohm |
| 240 mA/cm$^2$ | 836 mV | | | |

The above operating results exhibit stable cell operation, as good as we have found with currently used Ni/Cr anodes.

EXAMPLE III

Porous anodes were prepared for 3 cm$^2$ laboratory scale molten alkali metal carbonates fuel cells in accordance with the process of this invention with 40 weight percent iron in the final structures 68.8 g nickel powder of an average size of 3 microns was mixed with 8.0 g NiO powder of an average size of 5 microns, 8.9 g $Fe_2O_3$ having particle sizes of less than 5 microns and 44 g iron powder of an average size of 5 microns. 80 g of an 18 weight percent acrylic based binder system and 17 g methylene chloride were mixed with the powders to form a slurry. The slurry was slipcast to form a tape using a doctor blade opening of 1.4 mm and a slip viscosity of 1000 cP. The liquid solvent was evaporated overnight at room temperature. The binder was removed by placing the tape in a furnace and heating to 400° C. over a 4 hour period under a 10% $H_2$/90% $N_2$ atmosphere. The oxide powders were reduced and the metal powders sintered and alloyed by slowly heating the tape from 400° C. to 700° C. over a 4 hour 30 minute time period followed by heating from 700° C. to 800° C. over a 50 minute period and holding 800° C. for 30 minutes. The tape was then allowed to remain in the furnace as the furnace cooled to room temperature at its natural rate. The tape was removed and coated with LiOH in a weight equal to 10% of the sintered tape. A portion of this tape was replaced in the furnace and heated for 3 hours at 740° C. under a 10% $H_2$/90% $N_2$ atmosphere. The atmosphere in the furnace was then changed to a mixture of 0.5% $H_2$/99.5% $N_2$ with a 60° C. dew point. This atmosphere is reducing to nickel but oxidizing to pure iron. The tape was maintained under this atmosphere at 740° C. for 24 hours. During this time a small amount of lithium ferrite formed by reaction between lithium hydroxide and iron/nickel alloy within the tape.

EXAMPLE IV

The anode prepared in Example III was used to assemble a laboratory scale fuel cell as described in Example II. The anode was 67% porous with a mean pore diameter of 4.2 microns as measured before addition of the LiOH. The cell was operated for 2000 hours with the following cell characteristics:

| Current | Cell Potential | Polarization | | Total Resistance |
|---|---|---|---|---|
| | | Anode | Cathode | |
| OCV | 1056 mV | | | |
| 80 mA/cm$^2$ | 991 mV | | | |
| 160 mA/cm$^2$ | 926 mV | 29 mV | 49 mV | 0.111 ohm |
| 240 mA/cm$^2$ | 858 mV | | | |

EXAMPLE V

Porous anodes were prepared for 3 cm$^2$ laboratory scale molten alkali carbonates fuel cells in accordance with the process of this invention with 40 weight percent iron, 1.8 weight percent aluminum and the remainder nickel in the final product. 62 g of a nickel alloy containing 3 weight percent aluminum was used as a powder having particle size less than 20 microns and was mixed with 57 g of $Fe_2O_3$ powder having particle size less than 5 microns in diameter. 74 g of 18 weight percent acrylic based binder system and 37 g of methylene chloride were added with vibratory milling to form the slurry. The slurry was slipcast using a doctor blade opening of 1.1 mm and a slip viscosity of 5750 cP. The liquid was evaporated from the tape by drying overnight at room temperature. The dried tape was placed in a furnace under a 10% $H_2$/90% $N_2$ atmosphere and heated to 1000° C. over a 5 hour period. This temperature was maintained for 2 hours and then the furnace was allowed to cool to room temperature at its natural cooling rate. Some warping of tape was noted and lower heating rates are recommended.

EXAMPLE VI

The anode prepared in Example V was used to assemble a laboratory scale fuel cell as described in Example II. The anode was 54% porous with a mean pore diameter of 6.3 microns. The cell was operated for 2000 hours with the following cell characteristics:

| Current | Cell Potential | Polarization Anode | Polarization Cathode | Total Resistance |
|---|---|---|---|---|
| OCV | 1049 mV | | | |
| 80 mA/cm$^2$ | 965 mV | | | |
| 160 mA/cm$^2$ | 882 mV | 39 mV | 55 mV | 0.151 ohm |
| 240 mA/cm$^2$ | 794 mV | | | |

EXAMPLE VII

Porous anodes were prepared from nickel oxide and lithium ferrite for 3 cm$^2$ laboratory scale molten alkali metal carbonates fuel cell in accordance with the process of this invention with 30 weight percent nickel and 70 weight percent ferrite by mixing 35 weight percent NiO with 65 weight percent $LiFeO_2$. 19.1 g NiO powder having an average particle size of 5 microns was mixed with 35 g $LiFeO_2$ powder having agglomerates 20 to 40 microns in diameter composed of particles 3–5 microns in diameter. 34 g of an 18 weight percent acrylic based binder system and 9 g of methylene chloride were added to the powders and mixed in a vibratory mill to form a slurry. The slurry was slipcast using a doctor blade opening of 1.4 mm and a slurry viscosity of 2575 cP to form a tape. The liquid solvents were evaporated from the tape by air drying overnight at room temperature. The dried tape was placed in a furnace under a 1% $H_2$/99% $N_2$ atmosphere with a dew point of 60° C. and heated to 1040° C. over a 9 hour period, held at 1040° C. for 12 minutes and cooled to room temperature at the natural cooling rate of the furnace.

EXAMPLE VIII

The anode prepared in Example VII was used to assemble a laboratory scale fuel cell as described in Example II. The anode was 44% porous with a mean pore diameter of 1.9 microns. The cell was operated for 500 hours with the following cell characteristics:

| Current | Cell Potential | Polarization Anode | Polarization Cathode | Total Resistance |
|---|---|---|---|---|
| OCV | 1057 mV | | | |
| 80 mA/cm$^2$ | 978 mV | | | |
| 160 mA/cm$^2$ | 898 mV | 41 mV | 56 mV | 0.132 ohm |
| 240 mA/cm$^2$ | 815 mV | | | |

EXAMPLE IX

Porous anodes were prepared from nickel/aluminum alloy and iron oxide for 3 cm$^2$ laboratory scale molten alkali metal carbonates fuel cells in accordance with the process of this invention with approximately 56 weight percent iron, 43 weight percent nickel and 1 weight percent aluminum. Fabrication was accomplished by mixing 62 g of 97% nickel/3% aluminum alloy powder having a particle size less than 20 microns with 114 g of $Fe_2O_3$ powder having an average particle size of 5 microns and adding 215 g of 18 weight percent acrylic based binder system and 84 g of methylene chloride solvent in a vibratory mill. The slurry produced was slipcast at a blade opening of 1.8 mm and a slip viscosity of 1150 cP to form a thin tape. The liquid solvent was evaporated by air drying overnight at room temperature. The dried tape was placed in a controlled atmosphere furnace and heated from room temperature to 1000° C. in 5 hours under a 10% $H_2$/90% $N_2$ atmosphere. The temperature was maintained at 1000° C. for 2 hours and then the furnace allowed to cool at its natural cooling rate.

EXAMPLE X

The anode prepared in Example IX was used to assemble a laboratory scale fuel cell as described in Example II. The anode was 46% porous with a mean pore diameter of 1.6 microns. The cell was operated for 650 hours with the following cell characteristics:

| Current | Cell Potential | Polarization Anode | Polarization Cathode | Total Resistance |
|---|---|---|---|---|
| OCV | 1057 mV | | | |
| 80 mA/cm$^2$ | 976 mV | | | |
| 160 mA/cm$^2$ | 893 mV | 39 mV | 64 mV | 0.125 ohm |
| 240 mA/cm$^2$ | 810 mV | | | |

The above specific examples show that there are several satisfactory methods for fabricating metal alloy lithium ferrite composite anodes according to this invention and that such anodes provide stable cell performance.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for production of stable, high performance molten alkali metal carbonates fuel cell porous metal anodes, said process comprising:

mixing metal powder selected from the group consisting of nickel, nickel oxide, cobalt, cobalt oxide, nickel/aluminum alloy, cobalt/aluminum alloy, and mixtures thereof with an iron powder selcted from the group consisting of iron, iron oxide, lithium ferrite and mixtures thereof in quantities to form a powder mixture comprising about 25 to about 80 weight percent iron based upon the total weight of all components forming the anode structure, provided said aluminum when present comprises less than about 5 weight percent of said total weight;

mixing said powder mixture, a binder system, and sufficient liquid to form a slurry;
slipcasting said slurry into a thin tape;
evaporating said liquid;

heating to remove said binder to result in a powder mixture in thin tape form; and sintering said powder mixture in thin tape form under chemically reducing atmosphere to form a porous composite structure of lithium ferrite and a metal selected from the group consisting of nickel, cobalt, and an alloy of nickel/iron, cobalt/iron, nickel/iron/aluminum, cobalt/iron/aluminum and mixtures thereof.

2. A process according to claim 1 wherein said total iron content is about 30 to about 50 weight percent.

3. A process according to claim 1 wherein said aluminum is present in about 1 to about 3 weight percent of said anode structure.

4. A process according to claim 1 wherein said metal is principally nickel.

5. A process according to claim 1 wherein said metal is principally cobalt.

6. A process according to claim 1 wherein said lithium ferrite is present in an amount constituting about 50 to about 85 weight percent of said total iron.

7. A process according to claim 1 additionally comprising contacting said porous composite structure with a molten lithium compound selected from the group consisting of lithium hydroxide, lithium carbonate and mixtures thereof to convert a substantial portion of said iron to lithium ferrite.

8. A molten alkali metal carbonates fuel cell porous anode comprising a composite sintered structure of lithium ferrite and the remainder being a metal selected from the group consisting of nickel, cobalt, and an alloy of nickel/iron, cobalt/iron, nickel/iron/aluminum and mixtures thereof wherein the total iron content including said ferrite and said iron of said alloy is about 25 to about 80 weight percent, based upon the total weight of said anode composite sintered structure and said aluminum is present in about 1 to about 3 weight percent of said anode composite sintered structure.

9. A molten alkali metal carbonates fuel cell porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum and mixtures thereof wherein the total iron content including said ferrite and said iron of said alloy is about 25 to about 80 weight percent, based upon the total weight of said anode composite sintered structure, provided said aluminum when present comprises less than about 5 weight percent of said anode composite sintered structure and said lithium ferrite is present in an amount constituting about 50 to about 85 weight percent of said total iron.

10. A molten alkali metal carbonates fuel cell porous anode according to claim 9 wherein said lithium ferrite is present in an amount constituting about 60 to about 80 weight percent of said total iron.

11. A molten alkali metal carbonates fuel cell porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum and mixtures thereof wherein the total iron content including said ferrite and said iron of said alloy is about 30 to about 60 weight percent, based upon the total weight of said anode composite sintered structure, provided said aluminum when present comprises less than about 5 weight percent of said anode composite sintered structure, said lithium ferrite is present in an amount constituting about 50 to about 85 weight percent of said total iron and said metal is principally nickel.

12. A molten alkali metal carbonates fuel cell porous anode according to claim 11 wherein the porosity is about 40 to about 60 percent and greater than about 90 percent of the pores have diameters less than about 15 microns in diameter.

13. A molten alkali metal carbonates fuel cell porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum and mixtures thereof wherein the total iron content including said ferrite and said iron of said alloy is about 30 to about 60 weight percent, based upon the total weight of said anode composite sintered structure, provided said aluminum when present comprises less than about 5 weight percent of said anode composite sintered structure, said lithium ferrite is present in an amount constituting about 50 to about 85 weight percent of said total iron and said metal is principally cobalt.

14. A molten alkali metal carbonates fuel cell porous anode according to claim 13 wherein the porosity is about 40 to about 60 percent and greater than about 90 percent of the pores have diameters less than about 15 microns in diameter.

15. In a molten alkali metal carbonates fuel cell of the type having an anode and a cathode with their respective current collectors, an electrolyte tile making contact with said anode and cathode, and a cell housing to physically retain the cell components, said electrolyte tile comprising alkali metal carbonates and an inert support material which upon cell operation at temperatures of about 500° to about 700° C. forms a paste in direct contact with a porous anode, the improvement of said porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum, and mixtures thereof wherein the total iron content including said ferrite and said iron of said alloy is about 25 to about 80 weight percent, based upon the total weight of said anode composite sintered structure and said aluminum is present in about 1 to about 3 weight percent of said anode composite sintered structure.

16. In a molten alkali metal carbonates fuel cell of the type having an anode and a cathode with their respective current collectors, an electrolyte tile making contact with said anode and cathode, and a cell housing to physically retain the cell components, said electrolyte tile comprising alkali metal carbonates and an inert support material which upon cell operation at temperatures of about 500° to about 700° C. forms a paste in direct contact with a porous anode, the improvement of said porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum, and mixtures thereof wherein the total iron content including said ferrite and said iron of said alloy is about 25 to about 80 weight percent, based upon the total weight of said anode composite sintered structure, said aluminum when present comprises less than about 5 weight percent of said anode composite sintered structure and said lithium ferrite is present in an amount constituting about 50 to about 85 weight percent of said total iron.

17. In a molten alkali metal carbonates fuel cell according to claim 16 wherein said lithium ferrite is present in an amount constituting about 60 to about 80 percent of said total iron.

18. In a molten alkali metal carbonates fuel cell of the type having an anode and a cathode with their respective current collectors, an electrolyte tile making contact with said anode and cathode, and a cell housing to physically retain the cell components, said electrolyte tile comprising alkali metal carbonates and an inert support material which upon cell operation at temperatures of about 500° to about 700° C. forms a paste in direct contact with a porous anode, the improvement of said porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum, and mixtures thereof wherein the total iron content including said ferrite and said iron of said alloy is about 30 to about 60 weight percent, based upon the total weight of said anode composite sintered structure and said aluminum when present comprises less than abut 5 weight percent of said anode composite sintered structure, said lithium ferrite is present in an amount constituting about 50 to about 85 weight percent of said total iron and said metal is principally nickel.

19. In a molten alkali metal carbonates fuel cell according to claim 18 wherein the porosity is about 40 to about 60 percent and greater than about 90 percent of the pores have diameters less than about 15 microns in diameter.

20. In a molten alkali metal carbonates fuel cell of the type having an anode and a cathode with their respective current collectors, an electrolyte tile making contact with said anode and cathode, and a cell housing to physically retain the cell components, said electrolyte tile comprising alkali metal carbonates and an inert support material which upon cell operation at temperatures of about 500° to about 700° C. forms a paste in direct contact with a porous anode, the improvement of said porous anode comprising a composite sintered structure of lithium ferrite and the remainder being a metal selected from the group consisting of nickel, cobalt, and an alloy of nickel/iron, cobalt/iron, nickel/iron/aluminum, cobalt/iron/aluminum, and mixtures thereof wherein the total iron content including said ferrite and said iron of said alloy is about 30 to about 60 weight percent, based upon the total weight of said anode composite sintered structure and said aluminum when present comprises less than about 5 weight percent of said anode composite sintered structure, said lithium ferrite is present in an amount constituting about 50 to about 85 weight percent of said total iron and said metal is principally cobalt.

21. In a molten alkali metal carbonates fuel cell according to claim 20 wherein the porosity is about 40 to about 60 percent and greater than about 90 percent of the pores have diameters less than about 15 microns in diameter.